United States Patent
Kumar et al.

(10) Patent No.: US 10,291,147 B2
(45) Date of Patent: May 14, 2019

(54) CURRENT REDUCTION SYSTEM FOR INVERTERS CONNECTED TO A COMMON BUS

(71) Applicant: General Electric Company, Schenectady, NY (US)

(72) Inventors: Ajith Kuttannair Kumar, Erie, PA (US); Subhas Chandra Das, Bangalore (IN)

(73) Assignee: GE GLOBAL SOURCING LLC, Norwalk, CT (US)

( * ) Notice: Subject to any disclaimer, the term of this patent is extended or adjusted under 35 U.S.C. 154(b) by 0 days.

(21) Appl. No.: 15/921,299

(22) Filed: Mar. 14, 2018

(65) Prior Publication Data

US 2018/0205326 A1    Jul. 19, 2018

Related U.S. Application Data

(63) Continuation-in-part of application No. 15/279,460, filed on Sep. 29, 2016.

(Continued)

(51) Int. Cl.
*H02M 7/538* (2007.01)
*H02M 7/44* (2006.01)

(Continued)

(52) U.S. Cl.
CPC .............. *H02M 7/44* (2013.01); *H02M 1/14* (2013.01); *H02M 7/5387* (2013.01);

(Continued)

(58) Field of Classification Search
CPC ...... H02M 1/14; H02M 7/44; H02M 7/53875; H02M 7/538; H02M 7/5387; H02M 2001/008; H02M 2007/53876

(Continued)

(56) References Cited

U.S. PATENT DOCUMENTS 3,304,484 A * 2/1967 Kernick ................ H02M 1/06
327/215
3,549,977 A * 12/1970 Watkins ................ H02M 7/00
307/24

(Continued)

OTHER PUBLICATIONS

Keiffendorf "Reduction of DC-Bus Capacitor Ripple Current With PAM/PWM Converter" IEEE Transactions on Industry Applications, vol. 40, No. 2, Mar./Apr. 2004 (8 pages).

(Continued)

*Primary Examiner* — Matthew V Nguyen
*Assistant Examiner* — Nusrat Quddus
(74) *Attorney, Agent, or Firm* — Christopher R. Carroll; The Small Patent Law Group LLC

(57) ABSTRACT

The systems and methods described herein relate to electrical circuits. A system (e.g., inverter current system) is provided. The system includes plural inverters connected to a common bus and at least one capacitor. The inverters are configured to convert a direct current (DC) through the common bus to an alternating current (AC), by alternating different switches of the inverters between open and closed states in a respective switching cycle for each of the inverters. The system includes a controller circuit. The controller circuit is configured to adjust a current conducted onto the common bus to the inverters so that a root mean square of the current meets one or more designated criteria. The controller circuit controls the inverters to apply a frequency shift to the respective switching cycle of one or more of the inverters.

17 Claims, 7 Drawing Sheets

Related U.S. Application Data

(60) Provisional application No. 62/484,773, filed on Apr. 12, 2017.

(51) Int. Cl.
 *H02M 1/14* (2006.01)
 *H02M 7/5387* (2007.01)
 *H02M 1/00* (2006.01)

(52) U.S. Cl.
 CPC .. *H02M 7/53875* (2013.01); *H02M 2001/008* (2013.01); *H02M 2007/53876* (2013.01)

(58) Field of Classification Search
 USPC .................. 363/71, 72, 95–98, 131–138
 See application file for complete search history.

(56) References Cited

U.S. PATENT DOCUMENTS

| | | | |
|---|---|---|---|
| 3,675,037 A * | 7/1972 | Hamilton | H02M 7/493 307/51 |
| 6,864,646 B2 | 3/2005 | Rahman et al. | |
| 7,593,243 B2 | 9/2009 | Ganev | |
| 8,213,199 B2 * | 7/2012 | Fishman | H02M 7/49 307/82 |
| 2004/0223348 A1 | 11/2004 | West | |
| 2009/0073726 A1 | 3/2009 | Babcock | |
| 2010/0226157 A1 * | 9/2010 | Ohnishi | H02M 5/4585 363/131 |
| 2010/0284208 A1 | 11/2010 | Nguyen et al. | |
| 2012/0134186 A1 | 5/2012 | Johnson et al. | |
| 2012/0235647 A1 | 9/2012 | Singh | |
| 2013/0121051 A1 * | 5/2013 | Weiss | H02H 7/09 363/131 |
| 2013/0144477 A1 | 6/2013 | Yamada et al. | |
| 2014/0340012 A1 | 11/2014 | Alba | |
| 2014/0361613 A1 * | 12/2014 | Huang | H02J 1/06 307/12 |
| 2016/0056744 A1 | 2/2016 | Khan | |
| 2016/0268917 A1 | 9/2016 | Ramsay et al. | |
| 2018/0205326 A1 * | 7/2018 | Kumar | H02M 7/44 |

OTHER PUBLICATIONS

International Search Report and Written Opinion issued in connection with corresponding PCT Application No. PCT/US2018/026399 dated Jul. 27, 2018.

\* cited by examiner

US 10,291,147 B2

CURRENT REDUCTION SYSTEM FOR INVERTERS CONNECTED TO A COMMON BUS

CROSS-REFERENCE TO RELATED APPLICATIONS

This application claims priority to U.S. Provisional Application No. 62/484,773, filed 12 Apr. 2017. Additionally, this application is a continuation-in-part of U.S. application Ser. No. 15/279,460 filed 29 Sep. 2016. The entire disclosures of these applications are incorporated herein by reference.

FIELD

Embodiments of the subject matter disclosed herein relate to electrical circuits.

BACKGROUND

A vehicle propulsion system may contain multiple traction inverters connected to a common bus. Additionally, some powered systems may have multiple auxiliary load inverters connected to the common bus. During the operation of the vehicle propulsion system, inverters are driven with a common switching frequency. Additionally, the inverters deliver a root mean square (RMS) current along the common bus. Conductively coupled to the common bus is a DC link filter capacitor. A size and/or cost of the DC link filter capacitor is selected based on amount of RMS current conducted along the common bus.

BRIEF DESCRIPTION

In an embodiment, a system (e.g., inverter current system) is provided. The system includes plural inverters connected to a common bus and at least one capacitor. The inverters are configured to convert a direct current (DC) through the common bus to an alternating current (AC), by alternating different switches of the inverters between open and closed states in a respective switching cycle for each of the inverters. The system includes a controller circuit. The controller circuit is configured to adjust a current conducted onto the common bus to the inverters so that a root mean square of the current meets one or more designated criteria. The controller circuit controls the inverters to apply a frequency shift to the respective switching cycle of one or more of the inverters.

In an embodiment, a method (e.g., to reduce a current of an inverter system) is provided. The method includes determining a number of inverters connected to a common bus and at least one capacitor. The inverters are configured to convert a direct current (DC) through the common bus to an alternating current (AC) by alternating different switches of the inverters between open and closed states in a respective switching cycle for each of the inverters. The method includes determining a frequency shift to the switching cycle of one or more of the inverters. The frequency shift being determined based on the number of inverters. The method further includes applying a frequency shift to a current conducted onto the common bus to the switching cycle of the one or more inverters so that a root mean square of the current meets one or more designated criteria.

In an embodiment, a system (e.g., inverter current system) is provided. The system includes plural inverters connected to a common bus and at least one capacitor. The inverters are configured to convert a direct current (DC) through the common bus to an alternating current (AC) by alternating different switches of the inverters between open and closed states in a respective switching cycle for each of the inverters. The system includes a controller circuit. The controller circuit is configured to adjust a current conducted onto the common bus to the inverters so that a root mean square of the current meets one or more designated criteria. The controller circuit controls the inverters to apply a frequency shift to the respective switching cycle of one or more of the inverters. The controller circuit is configured to apply the frequency shift by having the respective switching cycles of two or more of the inverters at different frequencies represented as pulse width modulations delivered by the controller circuit.

BRIEF DESCRIPTION OF THE DRAWINGS

The subject matter described herein will be better understood from reading the following description of non-limiting embodiments, with reference to the attached drawings, wherein below.

DETAILED DESCRIPTION

One or more embodiments of the inventive subject matter described herein provide systems and methods comprising a plurality of inverters connected to a common bus. The inverters are configured to convert a direct current (DC) conducted through the common bus to an alternating current (AC) at a switching frequency for different phases of the AC that is output from the inverters. A controller circuit is configured to adjust the inverters utilizing a pulse width modulation (PWM) signal to change the phases of the AC that is output from the inverters. The output from the inverters includes a root mean square (RMS) current. The controller circuit may be configured to adjust the RMS current by adjusting frequencies of the PWM signals to the inverters. For example, the controller circuit is configured to spread a harmonic current spectrum of the PWM signals in one embodiment.

At least one technical effect of the embodiments described herein reduces the RMS current, thereby enabling use of a smaller and/or less efficient DC link capacitor.

Figure 1:
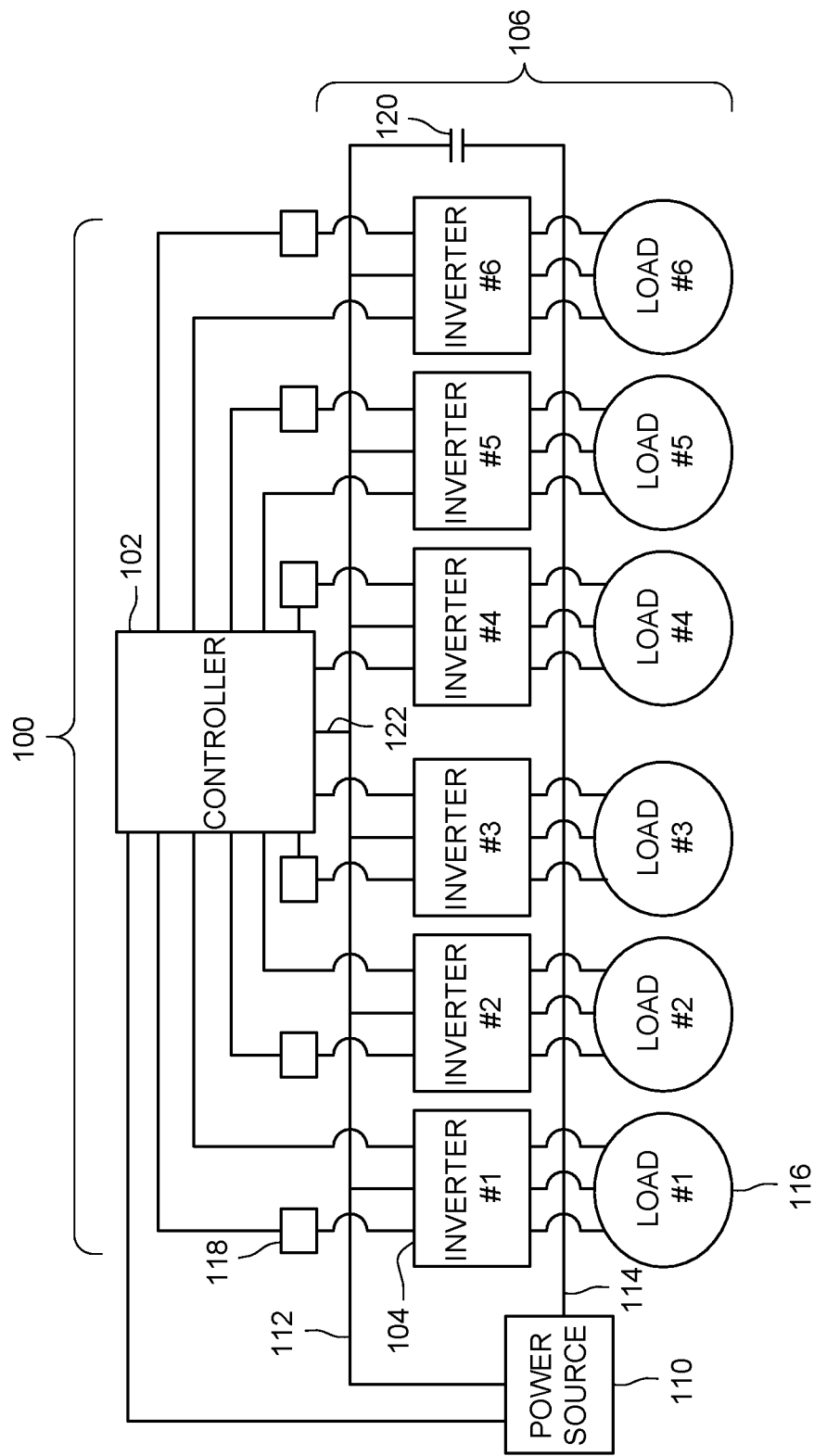
FIG. 1 illustrates an embodiment of an inverter current system.

FIG. 1 illustrates an embodiment of an inverter current system 100. The system 100 includes a controller circuit 102 operably connected with a plurality of inverters 104 ("Inverter #1", "Inverter #2", "Inverter #3", "Inverter #4", "Inverter #5", and "Inverter #6" in FIG. 1) of a circuit 106. The system 100 may be a part of a vehicle. The vehicle may represent a propulsion-generating vehicle system that generates tractive effort to propel the vehicle along a route. In one example, the vehicle may be a rail vehicle such as a locomotive, but alternatively may be another type of vehicle system. For example, the vehicle may be another type of off-highway vehicle (e.g., a vehicle that is not designed and/or not permitted to travel on public roadways), or may be an automobile, mining vehicle, and/or the like. Additionally or alternatively, the system 100 may include or be a stationary system, such as a power generator.

The controller circuit 102 may be connected with the inverters 104 via one or more wired and/or wireless connections to allow the controller circuit 102 to monitor and/or control operations of the inverters 104, as described herein. The controller circuit 102 may be configured to control switching cycles of the inverters 104. The switching cycles may be defined by a series of PWM signals generated by the controller circuit 102. The PWM signals may be a digital signal, such as a square wave, that adjust switches within the inverters 104. The PWM signals may be received from the controller circuit 102 along the wired and/or wireless connection to the corresponding inverters 104. Optionally, the PWM signals may be an asynchronous signal. The controller circuit 102 includes hardware circuitry that includes and/or is connected with one or more processors (e.g., microprocessors, field programmable gate arrays, and/or integrated circuits) that perform the operations described herein. The circuit 106 represents one or more hardware circuits that connect a power source 110 with the inverters 104 along common buses 112, 114. The power source 110 can represent one or more devices capable of providing electric current to the inverters 104 along the common buses 112, 114, such as an alternator and/or generator coupled with an engine, one or more batteries, and/or the like. The common buses may include a positive bus 112, which can conduct a positive portion of a DC from the power source to the inverters 104, and a negative bus 114, which can conduct a negative portion of the DC between the power source 110 with the inverters 104. The buses 112, 114 may be referred to as common buses because multiple inverters 104 are connected with the power source 110 by the same positive DC bus 112 and the same negative DC bus 114. In one embodiment, each of the buses 112, 114 can be a single conductive body or pathway, or multiple conductive bodies or pathways, with the inverters connected to the buses in parallel to each other.

The circuit 106 conducts DC from the power source 110 to the inverters 104, which convert the DC into alternating currents (ACs), which are supplied to multiple loads 116 ("Load #1", "Load #2", "Load #3", "Load #4", "Load #5", and "Load #6" in FIG. 1). The loads 116 can represent a variety of devices that perform work using the AC received from the inverters 104. For example, the loads 116 may represent traction motors, fan motors (e.g., blowers), cooling systems, heating systems, compressors, and/or the like. The number of inverters 104 and/or loads 116 shown in FIG. 1 are provided as one example. Optionally, as few as two inverters or more than six inverters may be used. For example, the system 100 may include fourteen inverters 104 and/or loads 116.

The controller circuit 102 and the power source 110 may be communicatively coupled by one or more wired and/or wireless connections. The controller circuit 102 may monitor operation of the power source 110 based on inputs to and/or outputs from the power source 110. For example, the controller circuit 102 may determine the current demanded from the power source 110 by the loads 116 based on input throttle settings of the motors (e.g., loads).

Operation of the inverters 104 may create or induce a ripple voltage or ripple current on the positive and/or negative DC common buses 112, 114. A capacitor or other capacitive element 120 may be connected between the positive and negative DC common buses 112, 114 to smooth out (e.g., reduce) variations in this ripple voltage or current. For example, the capacitor 120 may be a DC link filter capacitor. It may be noted the circuit 106 may include more than one capacitor 120.

Optionally, the system 100 may include inverter sensors 118 that monitor one or more characteristics of the inverters 104. In one embodiment, the inverter sensors 118 include voltmeters or ammeters that measure the voltages and/or currents conducted to the inverters 104 from the power source 110 via one or more of the common buses 112, 114. As shown in FIG. 1, each inverter 104 may have inverter sensors 118 connected to the inverter 104 for the controller circuit 102 to monitor characteristics of each inverter 104. The inverter sensors 118 are configured to measure the voltages provided to the inverters 104 and/or the currents and/or voltages that are output by the inverters 104. For example, an inverter sensor 118 may be coupled with the inverter 104 between the positive DC bus 112 and the inverter 104 to measure the input voltage or current and one or more additional inverter sensors 118 may be coupled with the inverter 104 between the inverter 104 and the load to measure the AC that is output by the inverter 104.

Figure 2:
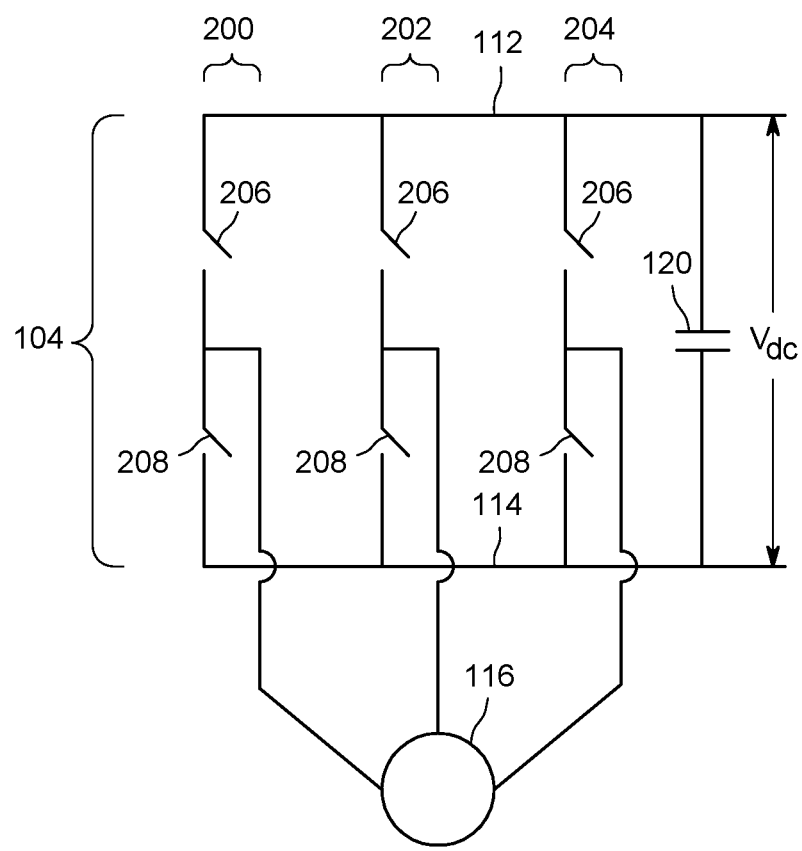
FIG. 2 illustrates an embodiment of an inverter shown in FIG. 1.

FIG. 2 illustrates an embodiment of the inverter 104 shown in FIG. 1. The inverter 104 may be a two level inverter having three sets or legs 200, 202, 204 of positive and negative switches 206, 208. Each leg 200, 202, 204 of the switches 206, 208 is connected with the positive and negative DC buses 112, 114 and converts DC received along the positive DC bus into one phase of the AC that is conducted to the load 116.

The three sets or legs 200, 202, 204 of the switches 206, 208 in the inverter convert the DC received along the same positive DC bus into three different phases of AC supplied to the load. The positive and negative switches 206, 208 in each leg of the inverter 104 may alternate between closed and open states during switching cycles. For example, the positing and negative switches 206, 208 may be controller by the controller circuit 102 utilizing a pulse width modulation (PWM) signal. For example, the PWM signal may define a switching cycle for each of the legs 200, 202, 204 of the inverter 104. The switching cycle defines the time periods that the positive switch 206 in an inverter leg 200, 202, 204 is closed and the negative switch 208 in the same inverter leg 200, 202, 204 is open, the time periods that the positive switch 206 in the inverter leg 200, 202, 204 is open and the negative switch 208 in the same inverter leg 200, 202, 204 is closed, and the frequency (or how rapidly) of the switches 206, 208 alternate between open and closed states. The frequency may correspond to the frequency of the PWM signals generated by the controller circuit 102.

For example, for each leg 200, 202, 204, the positive switch 206 may close while the negative switch 208 in the same leg 200, 202, 204 may open for a first time period to conduct a positive portion of the voltage of the AC to the load. During a different, second time period, the positive switch 206 in the leg 200, 202, 204 may open while the negative switch 208 in the leg 200, 202, 204 closes to conduct a negative portion of the voltage of the AC to the load 116. The positive and negative switches 206, 208 in each leg 200, 202, 204 of the inverter 104 may alternate between open and closed positions, respectively, at a switching frequency of the PWM signals to cause the DC to be converted into the AC.

Commonality in the switching frequencies (based on the PWM signals generated by the controller circuit 102) of the multiple inverters 104 connected to the same positive and negative DC buses 112, 114 (as shown in FIG. 1) increases an RMS current received by the capacitor 120. Additionally, the commonality in the phases of the multiple inverters 104 can create the ripple voltage or ripple current in the circuit 106 of the system 100 shown in FIG. 1, as described in U.S. patent application entitled, "RIPPLE CURRENT REDUCTION SYSTEM," having which is incorporated herein in its entirety by reference.

Figure 3:
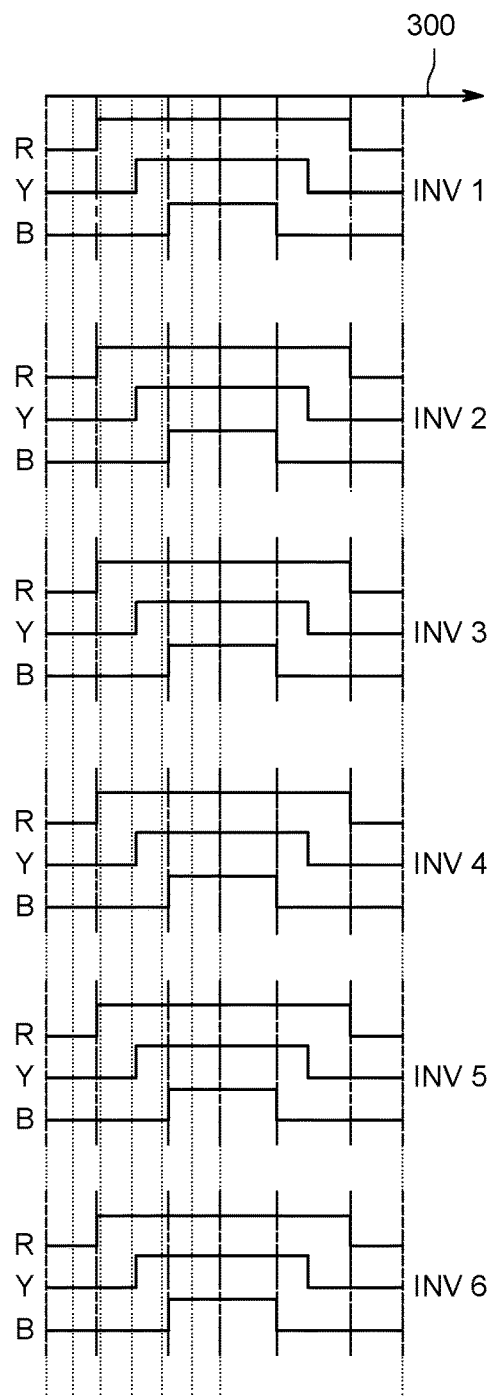
FIG. 3 illustrates switching cycles R, Y, B of the inverters by common pulse width modulation signals.

FIG. 3 illustrates switching cycles R, Y, B of the inverters 104 by common PWM signals. For each inverter 104 ("Inv 1", "Inv 2", "Inv 3", "Inv 4", "Inv 5", and "Inv 6" in FIG. 3), a switching cycle R, Y, B is shown for each of the legs 200, 202, 204 of the inverter 104 (shown in FIG. 2). The switching cycle R can represent the rate at which the positive and negative switches 206, 208 (shown in FIG. 2) of the first legs 200 of the inverters 104 alternate between closed and open states, the switching cycle Y can represent the rate at which the positive and negative switches 206, 208 of the second legs 202 of the inverters 104 alternate between closed and open states, and the switching cycle B can represent the rate at which the positive and negative switches of the third legs 204 of the inverters 104 alternate between closed and open states. The switching cycles for the inverters are shown alongside a horizontal axis 300 representative of time of the switching cycles (e.g., milliseconds). As shown in FIG. 3, the switching cycles are the same for the corresponding legs 200, 202, 204 in each of the inverters 104. This results in the switching cycles for the same legs 200, 202, 204 in the different inverters 104 changing at the same frequency.

Figure 4:
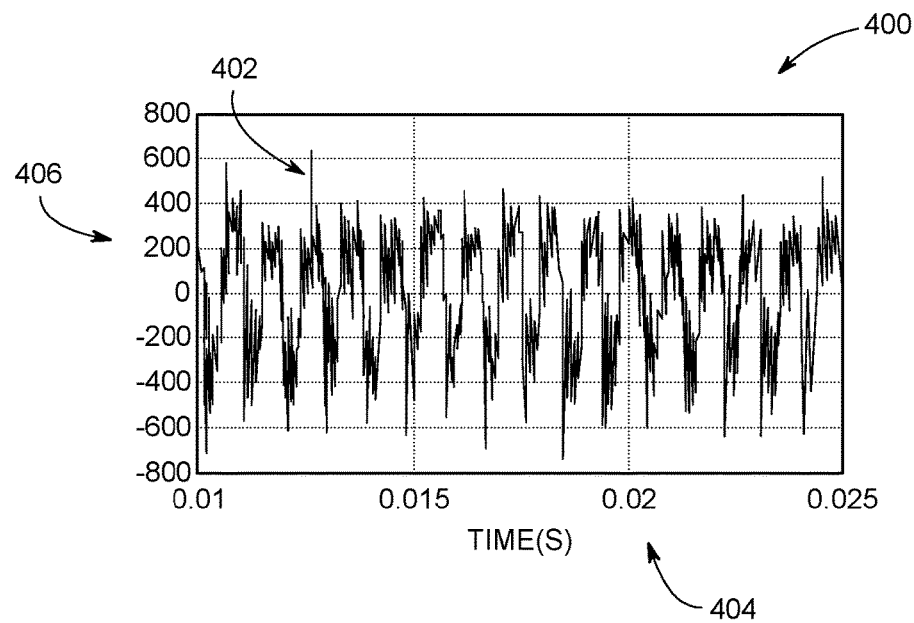
FIG. 4 is a graphical illustration of an embodiment of a current conducted across a capacitor of the inverter current system shown in FIG. 1.

FIG. 4 is a graphical illustration 400 of an embodiment of a current 402 conducted across the capacitor 120 of the system 100. The current 402 shown in FIG. 4 is shown alongside a horizontal axis 404 representative of time of the currents (e.g., in units of seconds) and a vertical axis 406 representative of magnitudes of the current 402 in units of amperes. The common frequency of the PWM signals result in an aggregated current along the common buses 112, 114 and conducted across the capacitor 120 shown as the current 402. For example, the common frequency of the PWM signals generated by the controller circuit 102 may be 540 hertz resulting in a frequency of approximately 1080 hertz across the capacitor 120.

Figure 5:
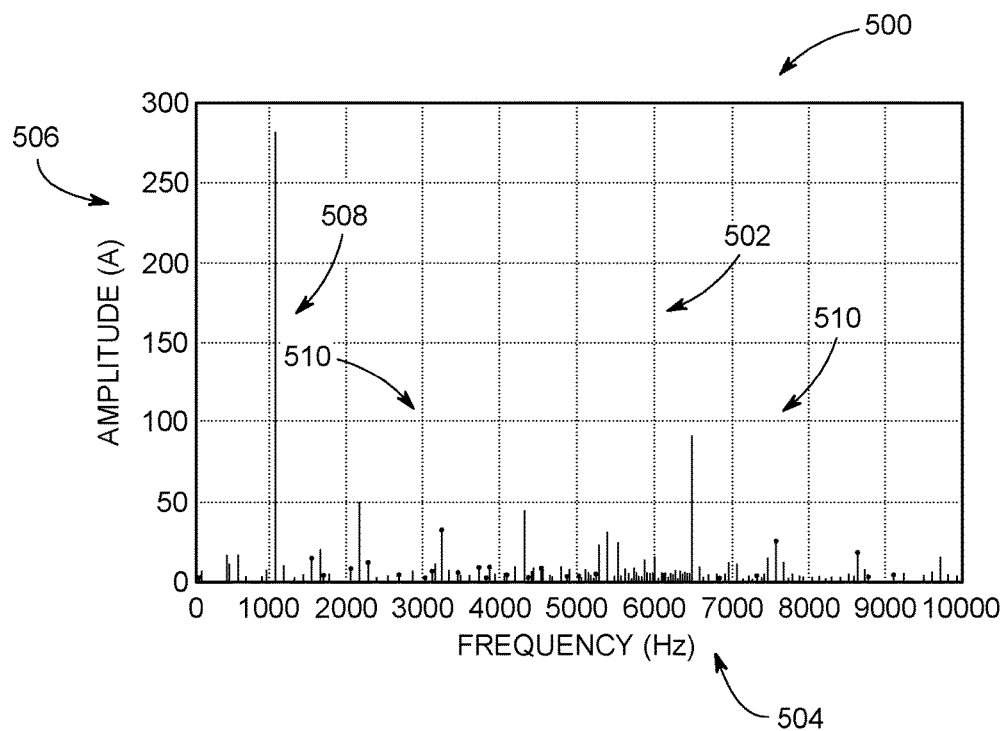
FIG. 5 is a graphical illustration of an embodiment of an amplitude spectrum of currents conducted across the capacitor shown in FIG. 4.

FIG. 5 is a graphical illustration 500 of an amplitude spectrum of currents 502 conducted across the capacitor 120 of the system 100 shown in FIG. 1. The currents shown in FIG. 5 are shown alongside a horizontal axis 504 representative of frequencies of the currents (e.g., in units of hertz) and a vertical axis 506 representative of magnitudes of the currents, such as RMS values of the currents in units of amperes. The currents 502 may include ripple currents conducted on the positive and negative DC buses 112, 114 during a time period of the switching frequencies of the inverters 104 are the same. For example, the currents shown in FIG. 5 may be created when the frequencies of the PWM signals generated by the controller circuit 102 for the inverters 104 are as shown in FIG. 3.

In the illustrated example of FIG. 5, the currents are generated based on the frequencies of the PWM signals of the inverters 104. Since the inverters 104 operate at a common switching frequency, additional peaks 510 in the currents across the capacitor 120 may be generated. The peaks 510 may represent ripple currents conducted along the positive and negative DC buses 112, 114. The peaks 510 may occur along the horizontal axis 504 at or near even multiples of the switching frequency (e.g., twice the switching frequency, four times the switching frequency, six times the switching frequency, and/or the like). A peak 508 is shown at 1080 hertz, indicating a peak frequency of the current across the capacitor 120. The peak 508 may be based on the frequency of the switching cycles of the inverters 104 corresponding to the PWM frequency. The total RMS of the current 502 peaks 508, 510 is over 284 amperes, as shown in FIG. 5. Based on the total RMS, a size and/or cost of the capacitor 120 may be determined.

In order to reduce the RMS current, the controller circuit 102 may be configured to apply a frequency shift to the respective switching cycles of the one or more inverters 104. The shift in switching cycles between the inverters reduces the RMS current across the capacitor 120.

Figure 6:
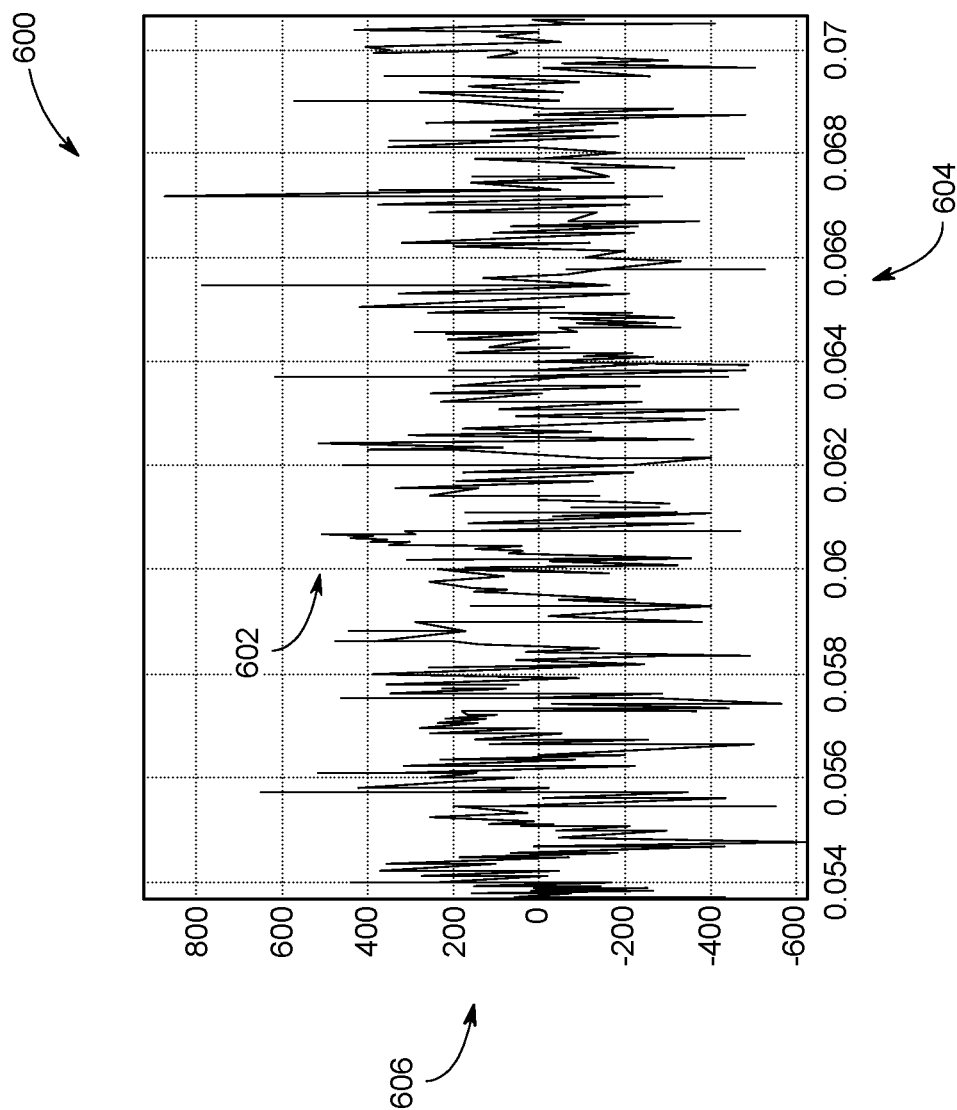
FIG. 6 is a graphical illustration of an embodiment of a frequency shifted current conducted across a capacitor of the inverter current system shown in FIG. 1.

FIG. 6 is a graphical illustration 600 of an embodiment of a frequency shifted current 602 conducted across the capacitor 120 of the system 100. The current 602 shown in FIG. 6 is shown alongside a horizontal axis 604 representative of time of the currents (e.g., in units of seconds) and a vertical axis 606 representative of magnitudes of the current 402 in units of amperes. The current 602 is based on the controller circuit 102 adjusting the PWM frequency for each of the inverters 104. For example, the controller circuit 102 may adjust the PWM frequency for each of the inverters 104 by a predetermined amount. The predetermined amount may be a set number of hertz (e.g., five, ten, fifteen, at least ten, and/or the like), a percentage (e.g., 2%, 3%, 5%, at least 2%, and/or the like), based on a number of inverters 104, based on a number of phases of the inverters 104 (e.g., three), and/or the like. For example, the controller circuit 102 may be configured to generate a different PWM frequency for each of the inverters 104, such as 525 hertz, 535 hertz, 545 hertz, 555 hertz, 565 hertz, and 575 hertz.

Additionally or alternatively, the controller circuit 102 may adjust only a portion of the PWM frequencies delivered to the inverters 104, such as two or more of the inverters 104. For example, the controller circuit 102 may adjust at least a first inverter 104 to have a frequency of 540 hertz and at least a second inverter 104 to have a frequency of 546 hertz. Optionally at least two of the inverters 104 may have the same frequency after the frequency shift. For example, three of the inverters 104 may have a frequency of 540 hertz and the remaining inverters 104 have a frequency of 546 hertz. Optionally, a difference between the frequencies may be based on a multiple of three (e.g., six hertz) and/or based on a number of phases of the inverters 104. For example, the inverters 104 may be based on three different phases, the controller circuit 102 may set the first and second frequencies of the switching cycles of the inverters 104 based on a multiple of three.

Figure 7:
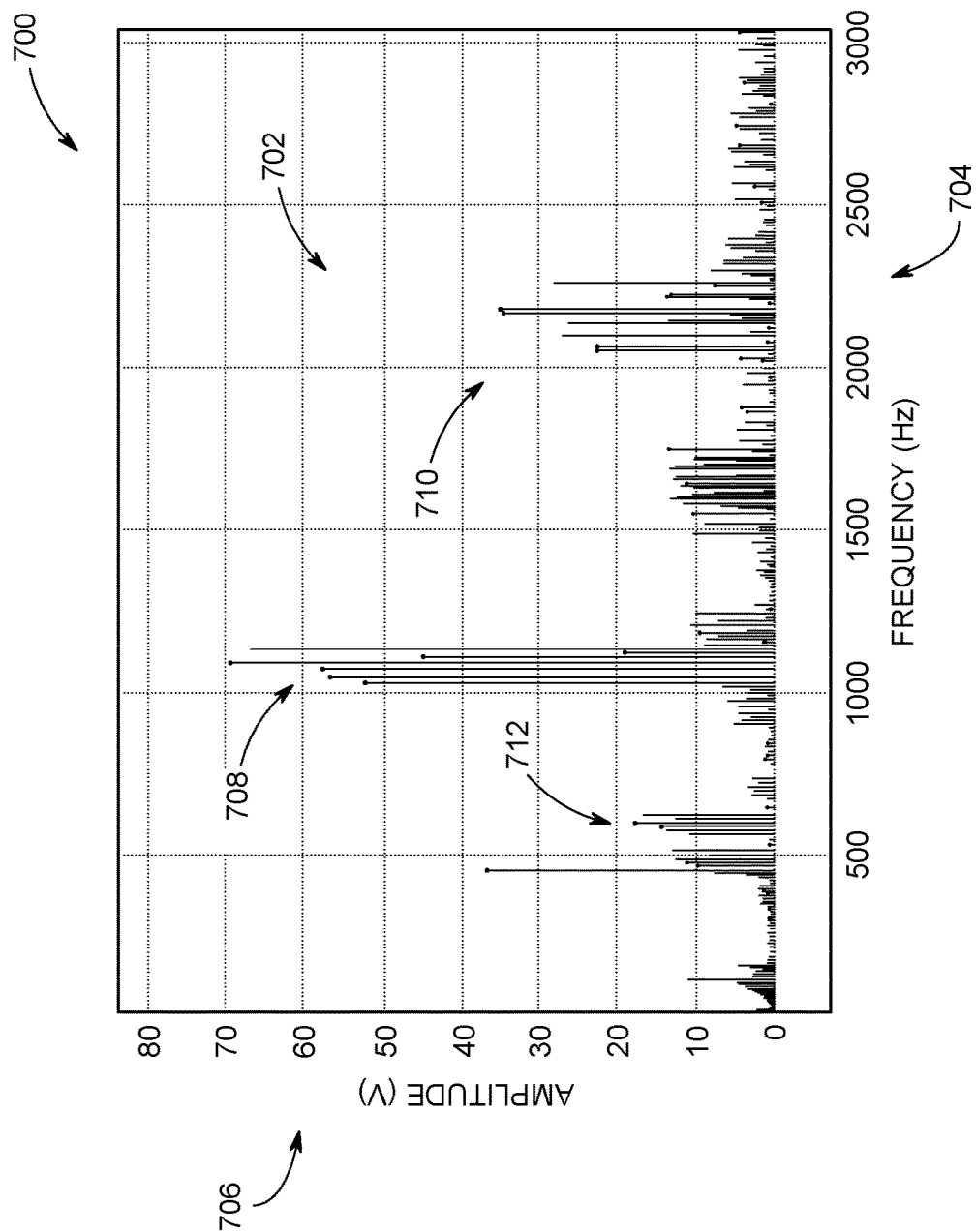
FIG. 7 is a graphical illustration of an embodiment of an amplitude spectrum of currents conducted across the capacitor shown in FIG. 6.

FIG. 7 is a graphical illustration 700 of an embodiment of an amplitude spectrum of currents 702 conducted across the capacitor 120. The currents 702 shown in FIG. 7 are shown alongside a horizontal axis 704 representative of frequencies of the currents (e.g., in units of hertz) and a vertical axis 706 representative of magnitudes of the currents, such as root mean square (RMS) values of the currents in units of amperes. The currents 702 may include ripple currents conducted on the positive and negative DC buses 112, 114 during a time period of the switching frequencies of the inverters 104. The peaks 710, 712 may represent ripple currents conducted along the positive and negative DC buses 112, 114. The peaks 710, 712 may occur along the horizontal axis 704 at or near even multiples of the switching frequency (e.g., twice the switching frequency, four times the switching frequency, six times the switching frequency, and/or the like).

As shown in the graphical illustration 700, the currents 702 do not include the peak 508 frequency of the current across the capacitor 120. Rather, the frequency shift of the PWM frequencies by the controller circuit 102 corresponds to a spreading of the harmonic current spectrum along the common bus 112, 114. For example, a plurality of peaks 708 are shown proximate to the 1080 hertz, however each of the plurality of peaks 708 at a different frequency along the horizontal axis 704. In comparison to the peak 508 shown in FIG. 5, the plurality of peaks 708 represent a spreading of the harmonic current spectrum at different frequency peaks. The plurality of peaks 708 may represent peak frequencies of the inverters 104 based on the frequency shift. For example, each of the peaks of the plurality of peaks 708 may correspond to one of the inverters 104. The plurality of peaks 708 may correspond to 1050 hertz, 1070 hertz, 1090 hertz, 1110 hertz, 1130 hertz, and 1150 hertz based on the PWM frequencies received by the inverters 104.

It may be noted that the currents 702 of the plurality of peaks 708 is lower relative to the peak 508 shown in FIG. 5. For example, the total RMS of the current 702 is approximately 177 amperes. Based on the frequency shift, the RMS of the current 702 is lower relative to the RMS of the current 502, which allows a reduced size and/or cost of the capacitor 120.

Figure 8:
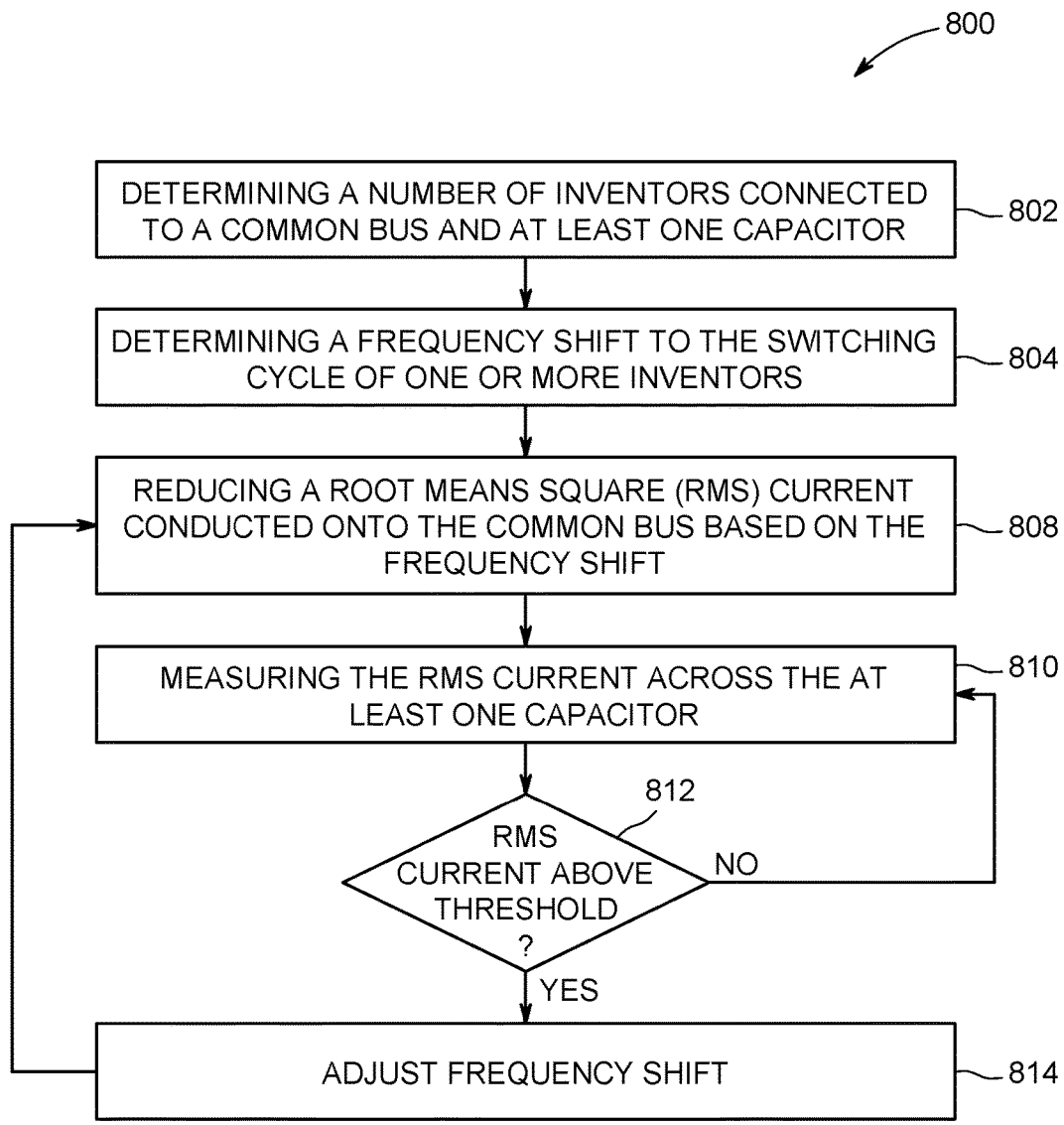
FIG. 8 is a flow chart of a method to reduce a current of an inverter system.

FIG. 8 illustrates a flow chart of a method 800 to reduce a current of an inverter current system 100. The method 800, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 800 may be used as one or more algorithms to direct hardware to perform one or more operations described herein. It should be noted, other methods may be used, in accordance with embodiments herein.

At 802, the controller circuit 102 may be configured to determine a number of inverters 104 connected to a common bus 112, 114 and at least one capacitor 120. The inverters 104 are configured to convert a DC through the common bus 112, 114 to an AC by alternating different switches 206, 208 of the inverters 104 between open and closed sates in a respective switching cycle for each of the inverters 104. The number of inverters 104 may be stored in a memory (e.g., a tangible and non-transitory computer readable medium such as flash memory, RAM, ROM, EEPROM, and/or the like) operatively coupled to the controller circuit 102. Additionally or alternatively, the controller circuit 102 may determine a number of inverters 104 of the system 100 based on a number of PWM signals delivered to the inverters 104.

At 804, the controller circuit 102 may be configured to determine a frequency shift to the switching cycle of the one or more inverters 104. The frequency shift may be determined based on the number of inverters 104. For example, the controller circuit 102 may determine a number of frequencies based on the number of inverters 104. The controller circuit 102 may determine the number of inverters 104 to be six as shown in FIG. 1. For example, the controller circuit 102 may group the inverters 104 into portion having an equal number of inverters 104. The controller circuit 102 may group the inverters 104 into two groups, each having a different frequency. In another example, the controller circuit 102 may group the inverters 104 into three groups. The controller circuit 102 may adjust each of the PWM signals to the three groups to have a different frequency. In another example, the controller circuit 102 may have each of the PWM signals have a different frequency. The PWM signals may represent the respective switching cycles for the inverters 104.

It may be noted that the different frequencies assigned to the groups and/or the inverters 104 may vary based on a predetermined amount. The predetermined amount may be stored in the memory. The predetermined amount may be a set number of hertz (e.g., five, ten, fifteen, at least ten, and/or the like), a percentage (e.g., 2%, 3%, 5%, at least 2%, and/or the like), based on a number of inverters 104, based on a number of phases of the inverters 104 (e.g., three), and/or the like.

At 808, the controller circuit 102 may be configured to reduce an RMS current conducted onto the common bus 112, 114 based on the frequency shift. In connection with FIG. 7, the frequency shift may correspond to spreading of the harmonic current spectrum along the common bus 112, 114. For example, the plurality of peaks 708 may be based on the different frequencies of the PWM signals delivered to the inverters 104 by the controller circuit 102. For example, each of the peaks 708 may correspond to one of the inverters 104 at a frequency of the PWM signal. Based on the frequency shift, the RMS current across the capacitor 120 is reduced.

In connection with FIG. 5, the controller circuit 102 may deliver a common frequency of the PWM signal to each of the inverters 104. Based on the common frequency, the RMS current across the capacitor 120 is approximately 284 amperes.

In connection with FIG. 7, by adjusting the frequencies of the PWM signals of at least two inverters 104, the RMS current is reduced across the capacitor 120 relative to the RMS current shown in FIG. 5.

At 810, the controller circuit 102 may be configured to measure the RMS current across the at least one capacitor 120. For example, the controller circuit 102 may be conductively coupled to the common bus 112, 114 at 122 in FIG. 1. Optionally, the 122 may be a voltage and/or current sensor. Additionally or alternatively, the controller circuit 102 may include an analog to digital converter (ADC) and/or analog front end that is coupled at 122, which measures a voltage and/or current of the common bus 112, 114. The controller circuit 102 may be configured to measure the current across the common bus 112, 114 at the capacitor 120 at 122. Based on the electrical characteristics of the capacitor 120 stored in the memory (e.g., capacitance), the controller circuit 102 may determine the RMS current across the capacitor 120.

At 812, the controller circuit 102 may be configured to determine the RMS current is above a threshold. For example, the threshold may be a predetermined non-zero threshold stored in the memory. The threshold may be based on the electrical characteristics of the capacitor 120 and an RMS current the capacitor 120 is configured and/or specified to handle within the system 100. For example, the capacitor 120 may be manufactured to handle an amount of current within the system 100. If the current is above the specified current of the capacitor, the capacitor 120 may be damaged and/or become defected. The threshold may be at the specified RMS current and/or less than the specified amount of RMS current for the capacitor 120.

If the RMS current is above the threshold, then at 814, the controller circuit 102 may be configured to adjust the frequency shift. The controller circuit 102 may be configured to increase a number of inverters 104 having different frequencies of the PWM signals for the switching cycle of the inverters 104. In an embodiment, the controller circuit 102 may have two different frequencies of the PWM signals corresponding to two different groups of the inverters 104. For example, the controller circuit 102 grouped the inverters 104 into a first group (e.g., "Inverter #1", "Inverter #2", "Inverter #3" shown in FIG. 1) to have a first frequency of the PWM signal and a second group ("Inverter #4", "Inverter #5", and "Inverter #6" shown in FIG. 1) to have a second frequency (e.g., difference than the first frequency). Based on the RMS current above the threshold, the controller circuit 102 may group the inverters 104 into three different groups each having a different frequency of the PWM signals. For example, the controller circuit 102 grouped a first group of the inverters 104 (e.g., "Inverter #1" and "Inverter #2" shown in FIG. 1) have a first frequency of the PWM signal, a second group (e.g., Inverter #3" and "Inverter #4") have a second frequency (e.g., different than the first frequency), and a third group (e.g., "Inverter #5" and "Inverter #6") have a third frequency (e.g., different than the first and second frequencies). Additionally or alternatively, the controller circuit 102 may assign a different frequency for each PWM signal delivered to the inverters 104.

In an embodiment, a system (e.g., inverter current system) is provided. The system includes plural inverters connected to a common bus and at least one capacitor. The inverters are configured to convert a direct current (DC) through the common bus to an alternating current (AC), by alternating different switches of the inverters between open and closed states in a respective switching cycle for each of the inverters. The system includes a controller circuit. The controller circuit is configured to adjust a current conducted onto the common bus to the inverters so that a root mean square of the current meets one or more designated criteria. The controller circuit controls the inverters to apply a frequency shift to the respective switching cycle of one or more of the inverters.

Optionally, the controller circuit is configured to apply the frequency shift by having the respective switching cycles of two or more of the inverters at different frequencies represented as pulse width modulations delivered by the controller circuit.

Optionally, the frequency shift corresponds to a spreading of a harmonic current spectrum along the common bus.

Optionally, the controller circuit is configured to apply the frequency shift by operating the respective switching cycle of a first group of one or more of the inverters at a first frequency and operating the respective switching cycle of a second, different group of one or more of the inverters at a different, second frequency. A frequency difference between the first and second frequencies is a multiple of three.

Optionally, the controller circuit is configured to apply the frequency shift by delivering a first frequency and a second frequency as the respective switching cycles. A frequency difference between the first and second frequencies is at least ten hertz.

Optionally, the controller circuit is configured to apply the frequency shift such that at least a first inverter and a second inverter of the plural inverters having respective switching cycles at a common frequency.

Optionally, the controller circuit is configured to apply the frequency shift such that each of the plural of inverters have a respective switching cycle at different frequencies.

Optionally, the plural inverters include at least three inverters.

Optionally, the controller circuit is configured to determine the frequency shift based on a number of the plural of inverters.

In an embodiment, a method (e.g., to reduce a current of an inverter system) is provided. The method includes determining a number of inverters connected to a common bus and at least one capacitor. The inverters are configured to convert a direct current (DC) through the common bus to an alternating current (AC) by alternating different switches of the inverters between open and closed states in a respective switching cycle for each of the inverters. The method includes determining a frequency shift to the switching cycle of one or more of the inverters. The frequency shift being determined based on the number of inverters. The method further includes applying a frequency shift to a current conducted onto the common bus to the switching cycle of the one or more inverters so that a root mean square of the current meets one or more designated criteria.

Optionally, by applying the frequency shift includes having the switching cycle of two or more of the inverters at different frequencies represented as pulse width modulations.

Optionally, the frequency shift corresponds to a spreading of a harmonic current spectrum along the common bus.

Optionally, by applying the frequency shift to the switching cycle of a first set of inverters include a first frequency and a second set of inverters include a second frequency. A frequency difference between the first and second frequency is based on a multiple of three.

Optionally, by applying the frequency shift to the switching cycle of a first set of inverters includes a first frequency and a second set of inverters includes a second frequency. A frequency difference between the first and second frequencies is at least ten hertz.

Optionally, by applying the frequency shift to the switching cycle includes at least a first inverter and a second inverter of the number of inverters having respective switching cycles at a common frequency.

Optionally, by applying the frequency shift to the switching cycle each of the one or more inverters have a respective switching cycle at different frequencies.

Optionally, the number of inverters include at least three inverters.

In an embodiment, a system (e.g., inverter current system) is provided. The system includes plural inverters connected to a common bus and at least one capacitor. The inverters are configured to convert a direct current (DC) through the common bus to an alternating current (AC) by alternating different switches of the inverters between open and closed states in a respective switching cycle for each of the inverters. The system includes a controller circuit. The controller circuit is configured to adjust a current conducted onto the common bus to the inverters so that a root mean square of the current meets one or more designated criteria. The controller circuit controls the inverters to apply a frequency shift to the respective switching cycle of one or more of the inverters. The controller circuit is configured to apply the frequency shift by having the respective switching cycles of two or more of the inverters at different frequencies represented as pulse width modulations delivered by the controller circuit.

Optionally, the controller circuit is configured to apply the frequency shift by operating the two or more inverters at a first frequency and a second frequency. A frequency difference between the first and second frequencies is a multiple of three.

Optionally, the controller circuit is configured to apply the frequency shift by operating the two or more inverters at a first frequency and a second frequency. A frequency difference between the first and second frequencies is at least ten hertz.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
plural inverters connected to a common bus and at least one capacitor, the inverters configured to convert a direct current (DC) through the common bus to an alternating current (AC) by alternating different switches of the inverters between open and closed states in a respective switching cycle for each of the inverters; and
a controller circuit configured to adjust a current conducted onto the common bus to the inverters so that a root mean square of the current meets one or more designated criteria, by controlling the inverters to apply a frequency shift to the respective switching cycle of one or more of the inverters;
wherein the controller circuit is configured to apply the frequency shift such that at least a first inverter and a second inverter of the plural inverters have respective switching cycles at a common frequency.

2. The system of claim 1, wherein the controller circuit is configured to apply the frequency shift by having the respective switching cycles of two or more of the inverters at different frequencies represented as pulse width modulations delivered by the controller circuit.

3. The system of claim 1, wherein the frequency shift corresponds to a spreading of a harmonic current spectrum along the common bus.

4. The system of claim 1, wherein the controller circuit is configured to apply the frequency shift by operating the respective switching cycle of a first group of one or more of the inverters at a first frequency and operating the respective switching cycle of a second, different group of one or more of the inverters at a different, second frequency, and a frequency difference between the first and second frequencies is a multiple of three.

5. The system of claim 1, wherein the controller circuit is configured to apply the frequency shift by delivering a first frequency and a second frequency as the respective switching cycles, wherein a frequency difference between the first and second frequencies is at least ten hertz.

6. The system of claim 1, wherein the plural inverters include at least three inverters.

7. The system of claim 1, wherein the controller circuit is configured to determine the frequency shift based on a number of the plural of inverters.

8. A method comprising:
determining a number of inverters connected to a common bus and at least one capacitor, the inverters configured to convert a direct current (DC) through the common bus to an alternating current (AC) by alternating different switches of the inverters between open and closed states in a respective switching cycle for each of the inverters;

determining a frequency shift to the switching cycle of one or more of the inverters, the frequency shift determined based on the number of inverters; and applying the frequency shift to a current conducted onto the common bus to the switching cycle of the one or more inverters so that a root mean square of the current meets one or more designated criteria;

wherein by applying the frequency shift to the switching cycle each of the one or more inverters have a respective switching cycle at different frequencies for each of the one or more inverters.

9. The method of claim 8, wherein by applying the frequency shift includes having the switching cycle of two or more of the inverters at different frequencies represented as pulse width modulations.

10. The method of claim 8, wherein the frequency shift corresponds to a spreading of a harmonic current spectrum along the common bus.

11. The method of claim 8, wherein by applying the frequency shift to the switching cycle of a first set of inverters includes a first frequency and a second set of inverters includes a second frequency, a frequency difference between the first and second frequency is based on a multiple of three, wherein applying the frequency shift comprises at least one of operating the first set of the inverters at the first frequency and the second set of the inverters at the second frequency.

12. The method of claim 8, wherein by applying the frequency shift to the switching cycle of a first set of inverters include a first frequency and a second set of inverters include a second frequency, wherein a frequency difference between the first and second frequencies is at least ten hertz, wherein applying the frequency shift comprises at least one of operating the first set of the inverters at the first frequency and the second set of the inverters at the second frequency.

13. A method comprising:

determining a number of inverters connected to a common bus and at least one capacitor, the inverters configured to convert a direct current (DC) through the common bus to an alternating current (AC) by alternating different switches of the inverters between open and closed states in a respective switching cycle for each of the inverters;

determining a frequency shift to the switching cycle of one or more of the inverters, the frequency shift determined based on the number of inverters; and applying the frequency shift to a current conducted onto the common bus to the switching cycle of the one or more inverters so that a root mean square of the current meets one or more designated criteria; wherein by applying the frequency shift to the switching cycle includes at least a first inverter and a second inverter of the number of inverters having respective switching cycles at a common frequency, wherein the common frequency is along the common bus and conducted across the at least one capacitor.

14. The method of claim 8, wherein the number of inverters include at least three inverters.

15. A system comprising:

plural inverters connected to a common bus and at least one capacitor, the inverters configured to convert a direct current (DC) through the common bus to an alternating current (AC) by alternating different switches of the inverters between open and closed states in a respective switching cycle for each of the inverters; and a controller circuit configured to adjust a current conducted onto the common bus to the inverters so that a root mean square of the current meets one or more designated criteria, by controlling the inverters to apply a frequency shift to the respective switching cycle of one or more of the inverters, wherein the controller circuit is configured to apply the frequency shift by having the respective switching cycles of two or more of the inverters at different frequencies represented as pulse width modulations delivered by the controller circuit.

16. The system of claim 15, wherein the controller circuit is configured to apply the frequency shift by operating the two or more inverters at a first frequency and a second frequency, wherein a frequency difference between the first and second frequencies is a multiple of three, wherein applying the frequency shift comprises at least one of operating a first inverter at the first frequency and a second inverter at the second frequency.

17. The system of claim 15, wherein the controller circuit is configured to apply the frequency shift by operating the two or more inverters at a first frequency and a second frequency, wherein a frequency difference between the first and second frequencies is at least ten hertz, wherein applying the frequency shift comprises at least one of operating a first inverter at the first frequency and a second inverter at the second frequency.

* * * * *